Dec. 7, 1954 L. STEINFURTH 2,696,328
BLANK FEEDING APPARATUS
Filed March 10, 1951 3 Sheets-Sheet 1

INVENTOR.
LOUIS STEINFURTH
BY Hudson, Boughton,
Williams, David & Hoffmann
ATTORNEYS

INVENTOR.
LOUIS STEINFURTH

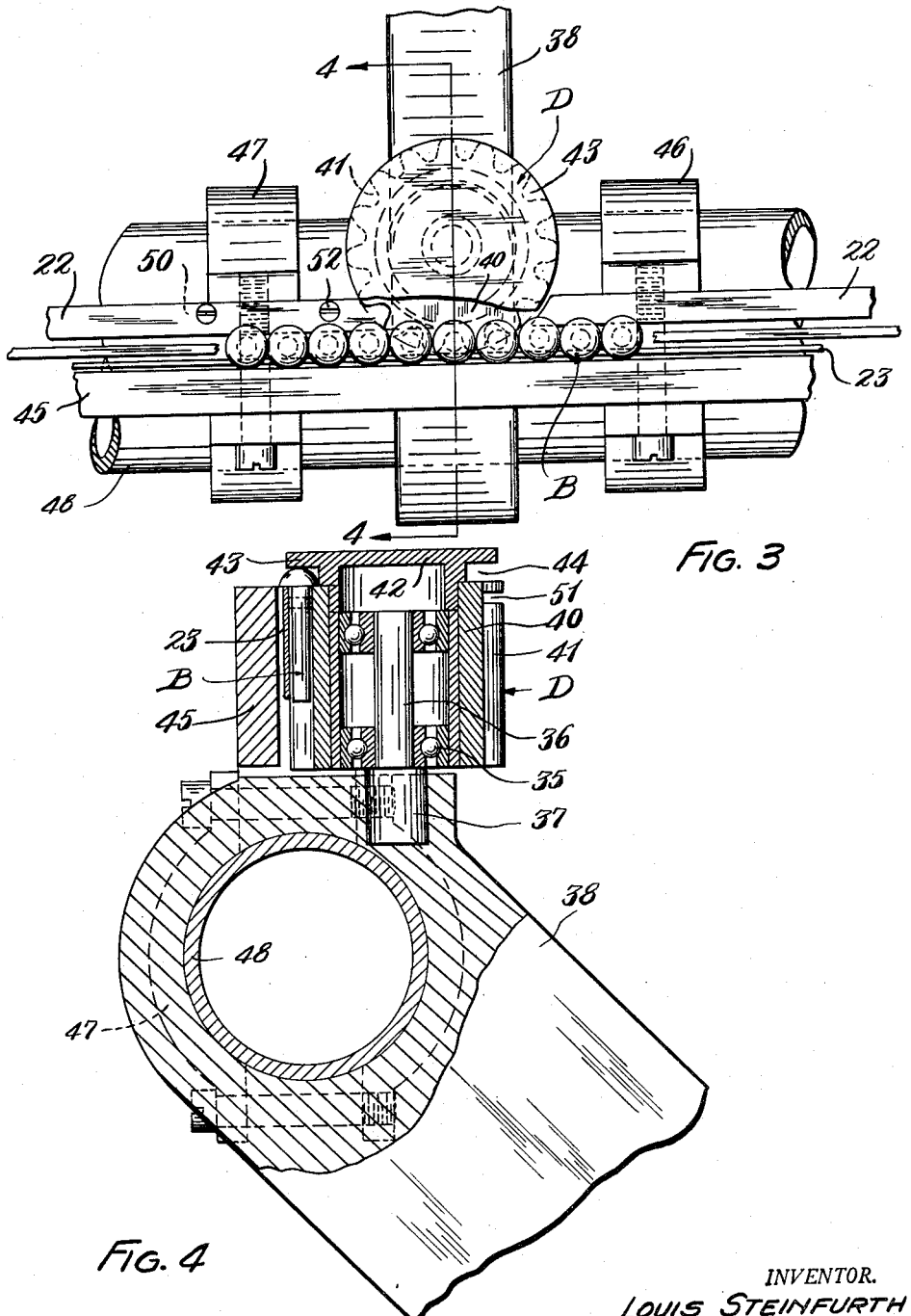

United States Patent Office 2,696,328
Patented Dec. 7, 1954

2,696,328

BLANK FEEDING APPARATUS

Louis Steinfurth, East Cleveland, Ohio, assignor to The National Screw & Manufacturing Company, Cleveland, Ohio, a corporation of Ohio Application March 10, 1951, Serial No. 214,904

3 Claims. (Cl. 221—225)

The present invention relates to apparatus for manufacturing headed and like articles, such as screws, and, more particularly, to apparatus for feeding and/or sorting articles of the character referred to.

The principal object of the invention is the provision of a novel and improved, high speed apparatus for feeding headed articles, such as screw blanks and the like, which apparatus will not feed blanks that are defective in a way which might cause damage to the machine being fed.

Further objects and advantages of the invention will be apparent to those skilled in the art to which it relates from the following description of the preferred embodiment described with reference to the accompanying drawings forming a part of this specification in which similar reference characters designate corresponding parts, and in which Fig. 1 is a perspective view, with parts broken away, of a high speed machine for slotting headed screw blanks and comprising feeding mechanism embodying the present invention;

Fig. 3 is a fragmentary plan view of a part of the feeding mechanism; and

Fig. 4 is a fragmentary sectional view approximately on the line 4—4 of Fig. 3.

Figure 1:
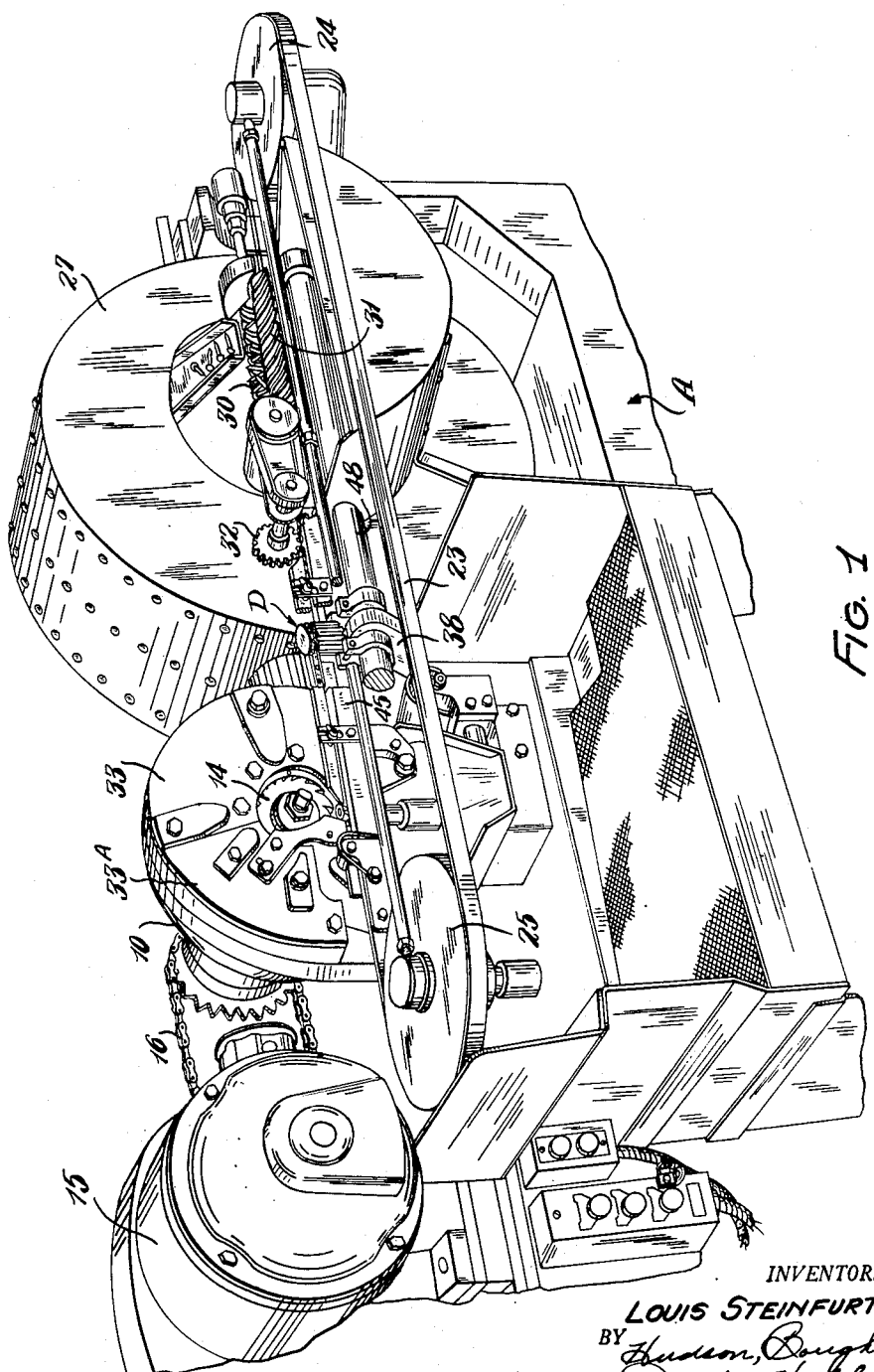
Figure 2:
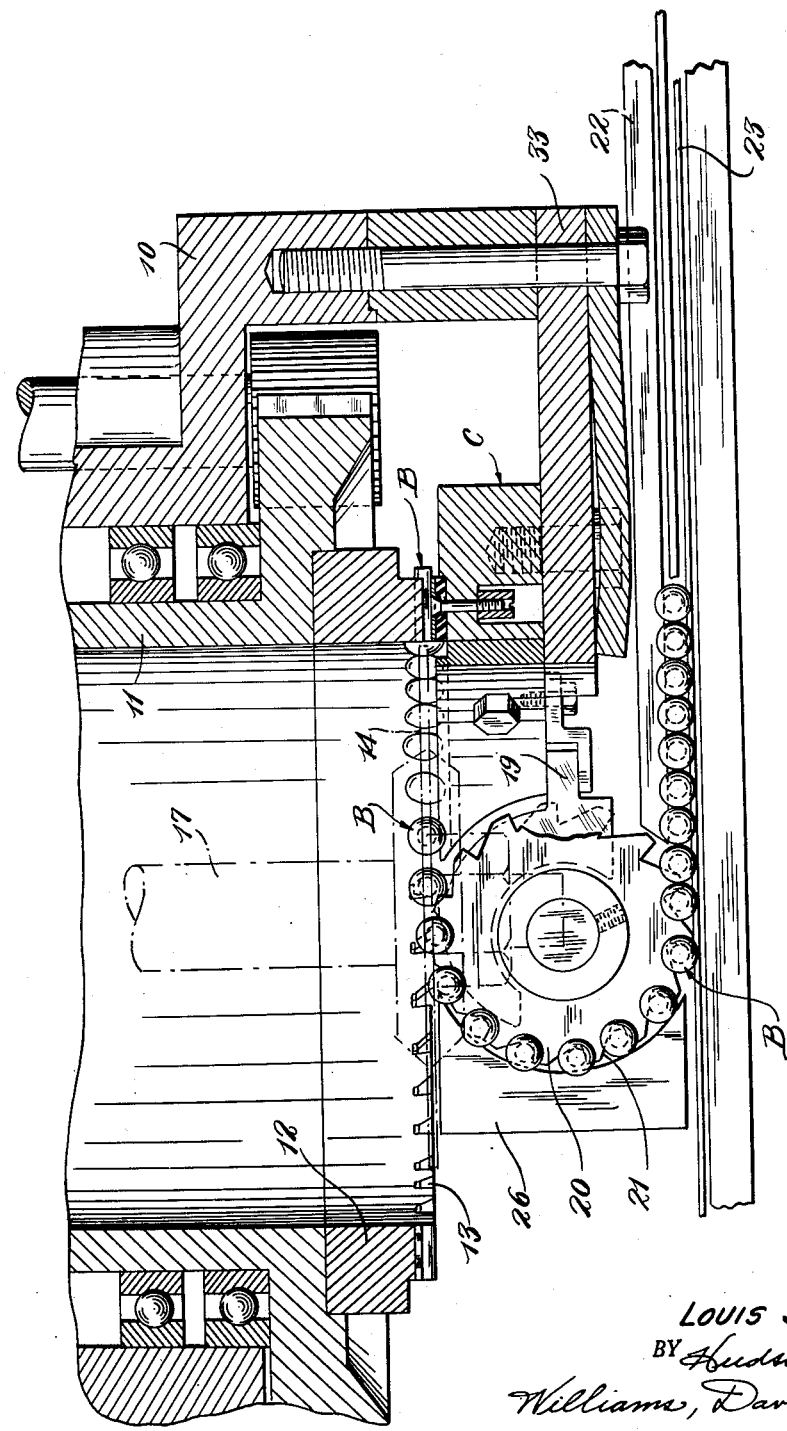
Fig. 2 is a fragmentary plan view, with parts in section, approximately through the center line of the carrier and with parts shown in dot-dash lines.

The invention is herein illustrated and described as embodied in a high speed apparatus for feeding round head type screw blanks to a high speed head slotting machine, but it is to be understood that the invention may be incorporated in other types of feeding apparatus.

Referring to the drawings, the head slotting machine shown therein comprises a base or frame A having a housing 10 including suitable bearings within which a tubular spindle 11 is supported having an article carrier 12 secured to its forwardly projecting end. The tubular spindle and the article carrier 12 are supported for rotation about a horizontal axis. The carrier 12 is adapted to be driven in any suitable manner and has the general shape of a cylindrical ring or member open at its forward end and provided with a forwardly projecting annular flange having a free radial face. The projecting end face of the carrier 12 is provided with a series of radial slots or grooves 13 for receiving headed articles, in the present instance round head type screw blanks B, to be slotted. The carrier 12 moves the blanks B fed thereto in a manner hereinafter described in a circular path past a circular saw 14 of slightly less diameter than the interior diameter of the carrier 12, which saw cuts slots in their heads as they pass thereby.

The saw 14 is located within the carrier 12 and positioned eccentrically thereto so that the saw engages the heads of the blanks B only during a portion of their travel thereabout, leaving a portion of the path traveled by the grooves 13 free for loading and unloading of the blanks. In the embodiment shown, the carrier 12 rotates in a counterclockwise direction, as viewed in Fig. 1, and the saw 14 is offset horizontally toward the right with respect to the axis of rotation of the carrier 12. The blanks are fed to the carrier at the bottom thereof and ejected therefrom approximately 270° later.

The saw 14, as shown, is driven from an electric motor 15 by a sprocket chain drive 16. The bearings for the spindle 17 upon which the saw is mounted are preferably so constructed that the axis of rotation of the saw can be adjusted horizontally to adjust the depth of cut to compensate for saw wear and permit the slotting of articles or blanks having heads of various shapes and sizes. The saw also has an axial adjustment for centering or properly locating the cut made thereby in the blank.

The articles or blanks to be slotted are fed to the carrier 12 by means comprising a feed wheel 20 supported for rotation about a vertical axis and having a plurality of slots 21 in its rim or circumference within which the articles are suspended by their heads as they are conveyed to the carrier 12. Alternatively the feed wheel 20 may have a lower flange upon which the lower ends of the shanks of the blanks rest, in which event the heads of the blanks are preferably raised slightly above the upper surface of the feed wheel. The axis of the feed wheel 20 intersects the axis of the carrier 12 and is spaced forwardly of the carrier such that the rim of the feed wheel just clears the face of the carrier with the upper surface of the feed wheel, substantially level or flush with the internal surface of the carrier at the bottom of the carrier.

The slots 21 of the feed wheel 20 are spaced from each other any suitable distance and the feed wheel is rotated in any convenient manner but in timed relation to the rotation of the carrier 12 so that when both members are rotating the slots in the respective members sequentially align with one another. The slots 21 may be of any suitable shape, such as the ratchet tooth form shown. The feed wheel 20 has a groove in its periphery for the reception of a stationary plow-like member 19 which pushes the blanks B from the slots 21 in the feed wheel 20 and into the slots 13 in the carrier 12 aligned therewith incident to the rotation of the feed wheel.

The blanks B are fed into the slots 21 in the feed wheel 20 by a conveyor comprising a stationary bar 22 spaced from a traveling endless band 23 encircling pulleys 24, 25 rotating about vertical axes, one of which pulleys is driven at a suitable speed. The construction is such that the blanks B are suspended by their heads from the bar 22 and the upper edge of the band 23 which may be slightly higher than the upper surface of the bar 22, and are moved toward the feed wheel 20 by the engagement of their heads with the upper edge of the traveling band 23 assisted by the engagement of their shanks with the flat vertical face of the traveling band. The body of the blanks is guided by the stationary bar 22. The discharge end of the bar 22 terminates just short of the feed wheel 20 and the traveling band 23 passes thereby substantially tangent thereto. This construction results in a blank being picked off of the conveyor formed by the stationary bar 22 and traveling band 23 each time a slot or tooth 21 in the feed wheel 20 passes the open end of the conveyor.

The blanks B are initially retained in the slots 21 of the feed wheel 20 by the band 23 and are subsequently retained therein by a stationary member 26 which extends from the band 23 to the face of the carrier 12. The stationary member 26 is fixedly connected to some suitable stationary part of the machine.

The blanks B may be fed to the conveyor formed by the stationary bar 22 and the traveling band 23 in any convenient manner. In the present instance this mechanism includes a rotating hopper 27 which discharges a continuous stream of blanks onto two parallel, oppositely rotating rollers 30, 31 having helical grooves or threads in their circumference, which rollers cooperate in aligning the blanks and locating them in the conveyor. A driven star or ratchet wheel 32 located above the conveyor adjacent to the discharge end of the rollers 30, 31 removes any blanks on the conveyor not properly positioned therein.

After the blanks B have been fed to the carrier 12 they are carried thereby past the saw 14 which cuts the conventional screw driver slots in their heads. As the blanks B leave the loading station at the bottom of the carrier, they are held in the slots 13 by a suitable arcuately-shaped guide member or pressure plate, designated generally as C, and secured as by bolts to the rear side of the plate-like member 33 along its radial inner edge. The lower end of the member C is curved and conforms closely to the periphery of the feed wheel 20 so that the blanks B as they move away from the trailing end of the plow member 19 are engaged by the pressure plate or guide member C and are held thereby within their respective slots 13 during the cutting operation.

As might be anticipated, damage to the saw or some other part of the machine being fed may result if an oversize blank or one having a crooked shank or the like is fed thereto. In order to prevent this, the feeding apparatus of the present invention includes means for stopping the feed in the event a blank gets into the feeding mechanism which is defective in a way that might damage the machine should it be fed thereto. Referring particularly to Figs. 3 and 4, the bar 22 forming the rear side of the conveyor is interrupted or has a section removed or cut out intermediate the star wheel 32 and the feed wheel 20 and a selector wheel, designated generally as D, is interposed therein.

The selector wheel D is supported by antifriction bearings 35 on a post 36 for rotation about a vertical axis. The post 36 has an enlarged lower end 37 by means of which it is fixed to the top of an arm or bracket 38 projecting from the frame A. The selector wheel D comprises a generally cylindrical part 40 having a plurality of longitudinal grooves 41 in its exterior sides and a cap-like member 42 providing an undercut flange 43 of substantially the same diameter as the cylindrical member 40 and spaced slightly above the upper top thereof. The members 40 and 42 are detachably secured together and the size of the grooves 41 corresponds substantially with the diameters of the blanks to be fed. The flange 43 forms with the upper end of the member 40 an undercut groove 44, the width and height of which corresponds substantially to the heads of the blanks being fed when the shanks of the blanks are properly positioned in the grooves 41.

The selector wheel D is substantially tangent with the movable band 23 and the construction is such that if the shank of a blank being fed is crooked or oversize or it its head is oversize, the blank will not enter one of the grooves 41 and/or the groove 44 and will not pass by the selector wheel D but will be wedged therebetween and the movable band 23. The movable band 23 is prevented from flexing sufficient to pass an oversize blank when such a blank becomes wedged therebetween and the selector wheel by a stationary bar 45 spaced from the opposite side of the band, see Fig. 4, where the spacing between the band 23 and the member 44 is shown exaggerated for purposes of illustration. In practice, this spacing is maintained at a minimum which will permit free travel of the band 23 under normal operating conditions.

The ends of the bar 22 adjacent to the selector wheel D are supported by brackets 46, 47 bolted to a tubular shaft 48 fixed in the bracket 38 and the right-hand end of the left-hand part of the bar 22, as viewed in Fig. 3, has a member 50 inserted in a groove formed in the bar, the right-hand end of which member projects into a groove 51 in the cylindrical member 40 of the wheel D and acts as a plow or guard to prevent the blanks B from being carried around by the selector wheel D after they have passed by the point of tangency between the selector wheel and band 23 and assure their continued movement along the conveyor formed by the bar 22 and the band 23. The member 50 is secured in the grooves in the bar 22 by screws 52. The selector wheel D is preferably made in the two parts 40, 42, as shown, so that the selector part of the feeding apparatus can be quickly set up to feed blanks having the same shank diameter but different size heads by merely replacing the upper part 42 of the selector wheel by a similar part but one which will provide a different predetermined size groove 44 therebetween and the upper end of the part 40.

It is believed that the operation of the device will be apparent from the foregoing description thereof. Suffice it to say that if one of the blanks B traveling along the conveyor formed by the bar 22 and the band 23 is of such a size or configuration that it will not pass between the selector wheel D and the band 23, the selector wheel will stop and the feed will be interrupted until the defective blank is removed.

The invention has been herein illustrated and described as embodied in an apparatus or mechanism for feeding a machine which saws the usual screw drive slots in the heads of screw blanks. The feeding apparatus selects or gauges the blanks as to their head diameter and height and as to their shank diameter and straightness, etc., and will not feed a blank the head or shank of which is over a predetermined size or the shank of which is crooked. It is to be understood, however, that the invention can be used to feed other machines; for example, rotary thread rollers and that by making suitable changes in the selector wheel, the blanks being fed can be selected or gauged as to any desired dimension, etc.

From the foregoing description of the preferred embodiment, it will be apparent that the objects of the invention heretofore enumerated and others have been accomplished and that there has been provided a new and improved, high speed apparatus for feeding headed articles such as screw blanks, which apparatus will not feed blanks that are defective in a way that might cause damage to the machine being fed.

While the invention has been described with considerable detail, it is not limited to the particular construction shown and it is my intention to cover hereby all adaptations, modifications and uses thereof which come within the practice of those skilled in the art to which it relates and within the scope of the appended claims.

Having thus described my invention, I claim:

1. In improved feed apparatus for headed screw blanks and the like, conveying means including spaced members having parallel faces forming a groove or slot within which the shanks of headed blanks suspended by said members are adapted to project, one of said members being movable to advance blanks suspended thereby through said slot or groove and having the face thereof which forms one side of said groove or slot engageable with the shanks of blanks projecting into said groove or slot, means for moving said member, a selector drum supported adjacent to said face of said movable member for rotation about fixed axis parallel with said face of said movable member and at right angles to its direction of movement, said selector drum having grooves therein comprising portions extending lengthwise of the axis of rotation of said selector drum and of a radial depth substantially equal to the diameter of the shanks of blanks to be fed, said portions of said slots being adapted to enclose a portion of the shanks of blanks passing thereby for approximately their entire length and forming with said movable member openings of predetermined configuration through which said blanks of predetermined shape moving along said conveying means may pass.

2. In improved feed apparatus for headed screw blanks and the like, conveying means including spaced members having parallel faces forming a groove or slot within which the shanks of headed blanks suspended by said members are adapted to project, one of said members being a traveling band one face of which forms one side of said groove or slot and is adapted to engage the shanks of blanks projecting into said groove or slot, means for moving said traveling band, a selector drum supported adjacent to said face of said traveling band for rotation about fixed axis parallel with said face of said band and at right angles to its direction of movement, said selector drum having grooves therein comprising portions extending lengthwise of the axis of rotation of said selector drum and of a radial depth substantially equal to the diameter of the shanks of blanks to be fed, said portions of said slots being adapted to enclose a portion of the shanks of blanks passing thereby for approximately their entire length and forming with said band openings of predetermined configuration through which said blanks of predetermined shape moving along said conveying means may pass, and means adjacent to said selector drum for limiting flexing of said band in a direction away from said selector drum.

3. In improved feed apparatus for headed screw blanks and the like, conveying means including spaced members having parallel faces forming a groove or slot within which the shanks of headed blanks suspended by said members are adapted to project, one of said members being a traveling band one face of which forms one side of said groove or slot and is adapted to engage the shanks of blanks projecting into said groove or slot, means for moving said traveling band, the other of said members being stationary and having an opening or interruption in its face or side forming the side of said groove or slot opposite said band, a selector drum supported in said opening in said stationary member adjacent to said traveling band for rotation about fixed axis parallel with said face of said band and at right angles to its direction of movement, said selector drum having grooves therein comprising portions extending lengthwise of the axis of rotation of said selector drum and of a radial depth substantially equal to the diameter of the shanks of blanks to be fed, said portions of said slots being adapted to enclose a portion of the shanks of blanks passing thereby for approximately their entire length and forming with said band openings of predetermined configuration through which said blanks of predetermined shape moving along said conveying means may pass, and means adjacent to said selector drum for limiting flexing of said band in a direction away from said selector drum.

References Cited in the file of this patent

UNITED STATES PATENTS

| Number | Name | Date |
|---|---|---|
| 1,571,232 | Brennan | Feb. 2, 1926 |
| 2,278,599 | Veit | Apr. 7, 1942 |
| 2,415,198 | Webb | Feb. 4, 1947 |